UNITED STATES PATENT OFFICE.

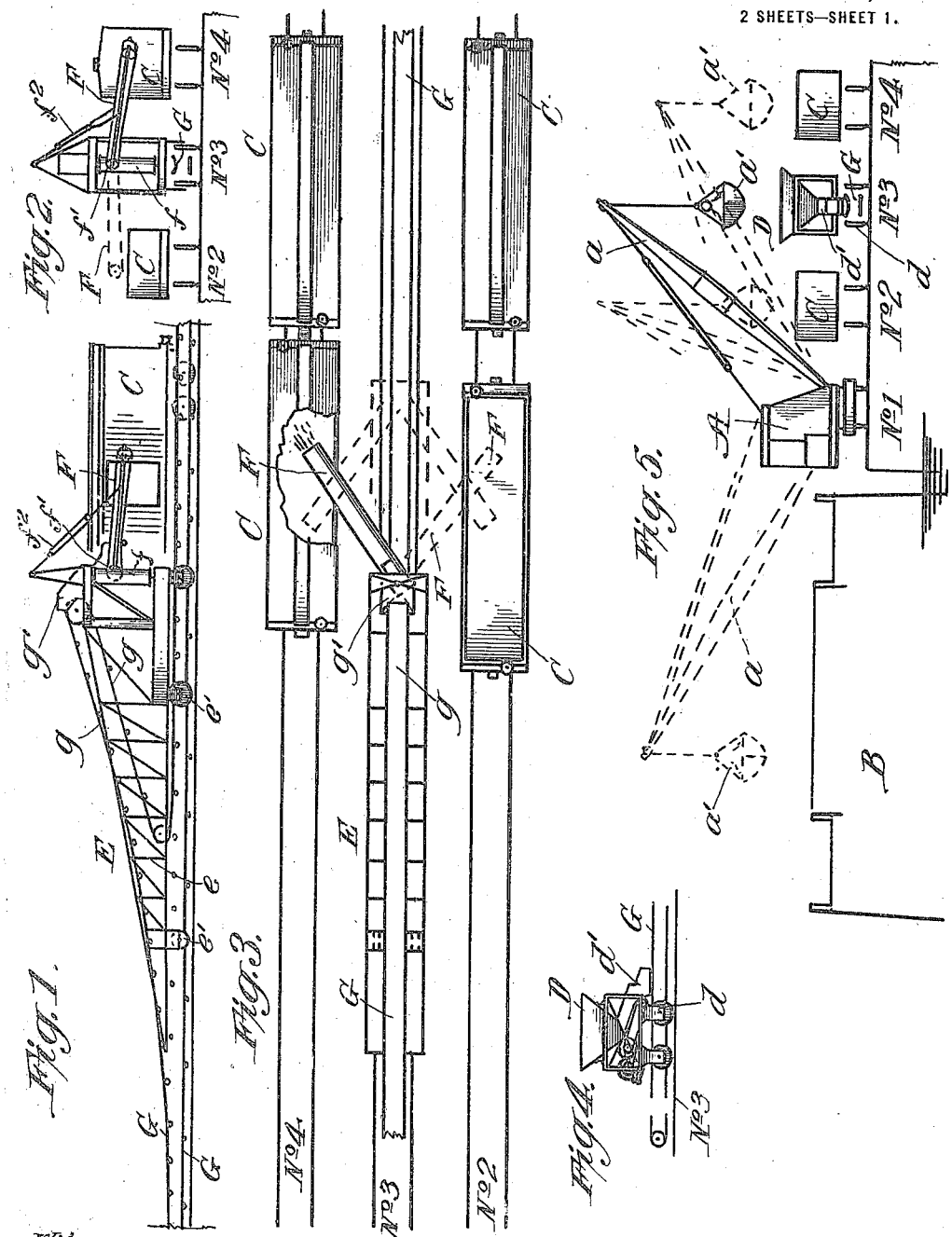

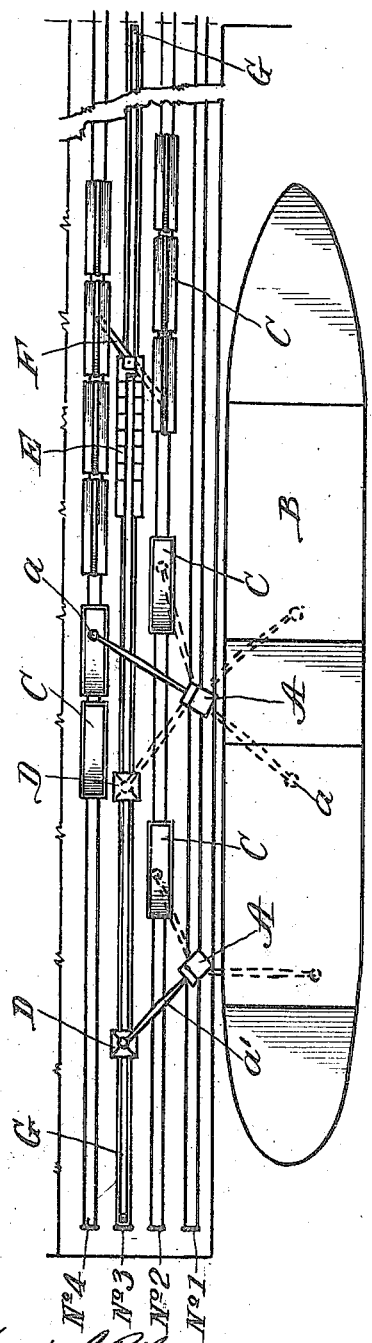

FRANCIS LEE STUART, OF BALTIMORE, MARYLAND.

APPARATUS FOR LOADING AND UNLOADING.

1,207,237. Specification of Letters Patent. Patented Dec. 5, 1916.

Application filed April 3, 1916. Serial No. 88,666.

*To all whom it may concern:*

Be it known that I, FRANCIS LEE STUART, a citizen of the United States, residing in Baltimore, Maryland, have invented certain new and useful Improvements in Apparatus for Loading and Unloading, of which the following is a specification.

This invention relates to apparatus for unloading coal, ore and other material from cars, barges, ships or other vessels or carriers, for delivering such material to other receptacles, for conveying the material to distant points, and for delivering it to and storing it in cars or other conveyers or to places of storage.

My improvements are especially designed for unloading barges or other floating vessels and for delivering such material to gondolas, box cars, or other such carriers traversing ordinary railway tracks.

In carrying out my invention I preferably organize the various parts of the system as follows: On an open pier or along shore or near bulkheads I provide tracks. Preferably four such tracks are used; two of which accommodate gondolas, or other cars, while a third supports locomotive cranes which are mounted on wheels traversing the third track whereby they may be moved from place to place as required. The fourth track is interposed between the two tracks first mentioned and on this track are disposed at suitable intervals trucks carrying hoppers which deliver to an endless carrier belt adapted to convey the material from the hoppers to an apparatus which is provided with a tripper and delivers to a boom conveyer in turn delivering to the cars or other carriers where the material is to be stored. The organization is such that the material being handled may be lifted by the cranes from the barges or other vessels or carriers, delivered directly to open or gondola cars alongside or to the hoppers which in turn deliver to the carrier belt which conveys the material to loading apparatus from which it passes by means of a boom conveyer to the box or gondola car or other carrier to be loaded.

My improvements are illustrated diagrammatically in the accompanying drawings, in which, Figure 1 is a diagrammatic view in side elevation of the loading apparatus and shows the relation of such apparatus with the conveyer belt and with the car to be loaded. Fig. 2 is also a diagrammatic view and shows an end elevation of the loading apparatus and cars on opposite sides of it which it is adapted to load. Fig. 3 is a plan view illustrating the relation of the main conveyer belt, the loading apparatus and the cars to be loaded. Fig. 4 is a detail view of one of the movable hoppers showing its relation with the conveyer belt. Fig. 5 is an end view showing the four tracks, a locomotive crane and the relation of the latter with a barge to be unloaded, cars to be loaded by the crane, and a hopper which may take material from the crane and deliver it to a conveyer belt. Fig. 6 is a plan view on a somewhat larger scale illustrating how the locomotive cranes may take material from a barge or ship and deliver it directly to cars or to hoppers which in turn deliver to a conveyer belt that carries the material to the loading apparatus. Fig. 7 is a diagrammatic plan view and illustrates also the relation of the cranes with the hoppers, the cars and the loading apparatus.

In the preferred system of loading and unloading apparatus organized in accordance with my invention, I use four tracks, No. 1, No. 2, No. 3, and No. 4. On track No. 1 there are one or more locomotive cranes A of any suitable well known kind and which may be moved to any desired position on the track. Each crane is equipped with a boom *a* carrying a clam-bucket *a'* or other receptacle for taking material from a barge or other vessel B. The boom is so mounted that it may be raised and lowered to any desired extent and swung from place to place as required.

On tracks Nos. 2 and 4 there are cars C which may be gondolas, box cars or other similar carriers. The cars may be disposed anywhere on the tracks as may be most convenient and the cranes and other apparatus hereinafter described may be shifted so that it is not necessary to break up a train of cars or to switch them or to move them from place to place as the cranes, hoppers and other loading apparatus may be suitably moved to deliver to the cars, but when circumstances permit, the cars may be shifted with relation to the cranes. Any desired number of hoppers D may be located on the track No. 3. Each of these hoppers is mounted on a truck $d$ traveling on track No. 3 and may be shifted to any desired position relatively to the cranes and each hopper is provided with a chute or spout $d'$ which delivers to a conveyer belt G. On track No. 3 is also located a movable loading apparatus E consisting of a frame $e$ mounted on wheels $e'$ and provided with a boom conveyer F supported at $f$ to swing about a vertical axis and pivoted at $f'$ for vertical adjustment by means of suitable tackle $f^2$. The loader E is connected with the endless carrier belt G which extends below the hoppers D and has a looped portion $g$ which extends to the upper portion of the loader and delivers through a hopper $g'$ to the boom conveyer F. The details of construction of the loading apparatus are fully shown and described in my application for Patent No. 88,665 filed April 3, 1916.

The organization is such that the loading apparatus may be moved from place to place on track No. 3 between the cars on tracks Nos. 2 and 4 in such manner as to deliver to any one of said cars on either track. Fig. 3 illustrates how this may be done and it will be seen that the boom conveyer may be made to deliver over any portion of a gondola car or may be passed through the open door of a box car and made to deliver the material to any part thereof and to thus trim or completely load the car. The loading apparatus may be shifted from car to car without disturbing the train of cars and where one or more cars is not to be loaded it may be passed by without moving the other cars.

It will thus be seen that by this system material can be taken from a barge, ship or other vessel or carrier, delivered directly to cars alongside, the crane being so mounted that it can be shifted from one hatch to another of the same vessel and made to deliver to a number of cars near by without moving said cars. As shown in Fig. 6 the boom of the crane is preferably of such length that it may deliver to cars on track No. 2, or may reach over to cars on track No. 4. If it is not possible or convenient to move the cars within reach of the crane the material may be delivered to the hoppers D which are so shifted as to come within the range of the cranes and they deliver to the continuously moving endless conveyer belt G which is adapted to carry the material any desired or reasonable distance to cars or receptacles at any point either near by or distant. Such material as is received by the conveyer belt is delivered to the boom conveyer F which in turn delivers to cars on either side of it in the manner before described.

I claim as my invention:

1. The combination with two parallel tracks for cars, of a third track between and parallel with those first mentioned and a fourth track also parallel with the other tracks, a movable crane supported on said last mentioned track, a movable hopper on the track between the car supporting tracks and to which the crane delivers, and loading apparatus comprising a conveyer belt receiving material from the hopper, and a boom conveyer to which the belt delivers mounted to swing in a vertical plane and to turn in a horizontal plane, substantially as hereinbefore described.

2. The combination of parallel car supporting tracks, a conveyer belt between said tracks, a tripper reeved with said belt, a track between the car supporting tracks on which said tripper is supported and on which it is movable to any desired extent while still maintaining its operative relation with the conveyer belt, a conveyer to which said tripper delivers and which is mounted to move about a vertical axis to extend to a box or gondola car on either side of the tripper, a hopper delivering to the main conveyer belt, and a crane mounted to move in a direction parallel with that of the conveyer belt and to deliver to said hopper or to cars on said car supporting tracks.

3. The combination of two tracks for supporting cars to be loaded, an intermediate track arranged between said first mentioned tracks, a hopper adapted to move over said intermediate track, another track arranged parallel with said intermediate track, hoisting and delivering apparatus movable on said track and delivering to cars to be loaded or to said hopper, a conveyer belt receiving material from the hopper, and loading apparatus connected with said belt movable on said intermediate track and provided with means for delivering to box, gondola or other cars or carriers on either side of said conveyer belt.

4. The combination of a series of tracks placed side by side, some of which are adapted to support cars to be loaded, a movable crane supported on one of said tracks and adapted to deliver directly to the cars, a movable hopper supported by another of said tracks between the car supporting tracks, a conveyer belt beneath said hopper, a tripper associated with said conveyer belt supported on the same track with the hopper and movable on said track to any desired position between the car supporting tracks, and a conveyer associated with the tripper and movable about a vertical axis to deliver to either box or gondola cars on either side of the track.

5. The combination with four parallel tracks, two of which support cars, of a crane supported by and movable on another of said tracks and provided with a boom conveyer delivering to cars on either of the car supporting tracks, a hopper supported by and movable on a track located between the car supporting tracks and to which the crane also delivers, a conveyer belt receiving material from the hopper, and a delivery conveyer receiving material from said conveyer belt, which is mounted to turn about a vertical axis and is adapted to deliver to cars on either of the two car supporting tracks.

In testimony whereof, I have hereunto subscribed my name.

FRANCIS LEE STUART.

Witnesses:
E. R. SPARKS,
A. H. SCHAEFFER.